United States Patent
Negroni et al.

(10) Patent No.: US 10,100,747 B2
(45) Date of Patent: Oct. 16, 2018

(54) FUEL SUPPLY SYSTEM FOR USE IN A GAS TURBINE ENGINE AND METHOD OF CONTROLLING AN OVERSPEED EVENT THEREIN

(71) Applicant: General Electric Company, Schenectady, NY (US)

(72) Inventors: Alberto Jose Negroni, Simpsonville, SC (US); David August Snider, Simpsonville, SC (US); William Forrester Seely, Taylors, SC (US); Keegan Saunders O'Donnell, Greenville, SC (US); Kyle Joseph Conger, Greenville, SC (US); Carlos Gabriel Roman, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 292 days.

(21) Appl. No.: 14/945,006

(22) Filed: Nov. 18, 2015

(65) Prior Publication Data

US 2017/0138271 A1    May 18, 2017

(51) Int. Cl.
*F02C 9/28* (2006.01)
*F02C 7/232* (2006.01)
(Continued)

(52) U.S. Cl.
CPC .............. *F02C 9/28* (2013.01); *F01D 21/02* (2013.01); *F02C 7/222* (2013.01); *F02C 7/232* (2013.01);
(Continued)

(58) Field of Classification Search
CPC .. F02C 7/22; F02C 7/222; F02C 7/232; F02C 9/28; F02C 9/46; F05D 2270/021; F01D 21/02; F23R 3/28
See application file for complete search history.

(56) References Cited

U.S. PATENT DOCUMENTS

| 4,010,606 A | 3/1977 | Hansen |
| 4,602,479 A | 7/1986 | Hansen |

(Continued)

FOREIGN PATENT DOCUMENTS

EP    1 806 490 A2    7/2007

OTHER PUBLICATIONS

Extended European Search Report and Opinion issued in connection with corresponding EP Application No. 16198703.7 dated Apr. 3, 2017.

*Primary Examiner* — Craig Kim
*Assistant Examiner* — Katheryn Malatek
(74) *Attorney, Agent, or Firm* — Armstrong Teasdale LLP

(57) ABSTRACT

A fuel supply system for use in a gas turbine engine is provided. The fuel supply system includes a fuel manifold, and a shutoff valve coupled in flow communication with the fuel manifold and positioned upstream from said fuel manifold. The shutoff valve is configured to actuate into a closed position when the gas turbine engine is operating at an overspeed condition. The system also includes a relief valve coupled in flow communication with the fuel manifold, wherein the relief valve is configured to release fuel from within the fuel manifold when the shutoff valve is in the closed position, and when a pressure within the fuel manifold is greater than a first predetermined threshold.

17 Claims, 3 Drawing Sheets

(51) Int. Cl.
*F23R 3/28* (2006.01)
*F01D 21/02* (2006.01)
*F02C 9/46* (2006.01)
*F02C 7/22* (2006.01)

(52) U.S. Cl.
CPC .................. *F02C 9/46* (2013.01); *F23R 3/28* (2013.01); *F02C 7/22* (2013.01); *F05D 2220/32* (2013.01); *F05D 2270/021* (2013.01)

(56) References Cited

U.S. PATENT DOCUMENTS

| | | | |
|---|---|---|---|
| 5,927,064 A | 7/1999 | Dyer et al. | |
| 6,401,446 B1 | 6/2002 | Gibbons | |
| 6,619,027 B1 | 9/2003 | Busch | |
| 6,898,939 B2 | 5/2005 | Busch | |
| 6,915,639 B1 | 7/2005 | Linebrink | |
| 8,224,552 B2 | 7/2012 | Van Vactor et al. | |
| 8,321,119 B2 | 11/2012 | Van Vactor et al. | |
| 8,904,804 B2 | 12/2014 | Tezuka et al. | |
| 8,991,148 B2 | 3/2015 | Dore et al. | |
| 2001/0022080 A1* | 9/2001 | Tanaka | F02C 3/22 60/39.465 |
| 2003/0061799 A1 | 4/2003 | Demers | |
| 2009/0025396 A1* | 1/2009 | Joshi | F02C 7/22 60/773 |
| 2009/0272118 A1* | 11/2009 | Alexander | F02C 3/22 60/772 |
| 2015/0159504 A1 | 6/2015 | Boerlage et al. | |

* cited by examiner

FUEL SUPPLY SYSTEM FOR USE IN A GAS TURBINE ENGINE AND METHOD OF CONTROLLING AN OVERSPEED EVENT THEREIN

BACKGROUND

The present disclosure relates generally to power generation systems and, more specifically, to systems and methods of controlling an overspeed event in a gas turbine engine.

At least some known gas turbine engines include at least one compressor, a combustor, and a high-pressure turbine coupled together in a serial flow relationship. More specifically, the compressor and high-pressure turbine are coupled through a shaft to form a high-pressure rotor assembly. Air entering the turbine engine is mixed with fuel and ignited to form a high energy gas stream. The high energy gas stream flows through the high-pressure turbine to rotatably drive the high-pressure turbine such that the shaft rotatably drives the compressor. After being discharged from the high-pressure turbine, the gas stream continues to expand as it flows through a low-pressure turbine positioned aft of the high-pressure turbine. The low-pressure turbine includes a rotor assembly coupled to a drive shaft and a fan. The low-pressure turbine rotatably drives the fan through the drive shaft. In some embodiments, the gas stream discharged from the turbines is channeled through a heat recovery steam generator. As such, hot steam is produced, and the steam is channeled through a steam turbine assembly for further producing power.

At least some known gas turbine engines may be susceptible to damage as a result of an overspeed event. For example, an overspeed event may occur when a generator coupled to the gas turbine engine is uncoupled from an external electrical load. The sudden loss of load on the generator can cause the speed of the gas turbine engine to dramatically increase. At least some known gas turbine engines include systems for shutting down the gas turbine engine upon detection of an overspeed even, such as a fuel shutoff valve that cuts off the flow of fuel supplied to the combustor. While the fuel shutoff valve is effective at shutting down the gas turbine engine, it is generally desirable to further reduce the amount of time that the gas turbine engine operates at an overspeed condition.

BRIEF DESCRIPTION

In one aspect, a fuel supply system for use in a gas turbine engine is provided. The fuel supply system includes a fuel manifold, and a shutoff valve coupled in flow communication with the fuel manifold and positioned upstream from said fuel manifold. The shutoff valve is configured to actuate into a closed position when the gas turbine engine is operating at an overspeed condition. The system also includes a relief valve coupled in flow communication with the fuel manifold, wherein the relief valve is configured to release fuel from within the fuel manifold when the shutoff valve is in the closed position, and when a pressure within the fuel manifold is greater than a first predetermined threshold.

In another aspect, a gas turbine engine is provided. The gas turbine engine includes a combustor, a fuel manifold configured to supply fuel to the combustor, and a shutoff valve coupled in flow communication with the fuel manifold and positioned upstream from the fuel manifold. The shutoff valve is configured to actuate into a closed position when the gas turbine engine is operating at an overspeed condition. The system also includes a relief valve coupled in flow communication with the fuel manifold, wherein the relief valve is configured to release fuel from within the fuel manifold when the shutoff valve is in the closed position, and when a pressure within the fuel manifold is greater than a first predetermined threshold.

In yet another aspect, a method of controlling an overspeed event in a gas turbine engine is provided. The method includes supplying a flow of fuel from a fuel source to a fuel manifold, determining an operating condition of the gas turbine engine, and stopping the flow of fuel to the fuel manifold when the gas turbine engine is operating at an overspeed condition. The flow of fuel is stopped by a shutoff valve positioned between the fuel source and the fuel manifold. The method also includes releasing the fuel downstream from the shutoff valve when the shutoff valve is in the closed position, and when a pressure within the fuel manifold is greater than a first predetermined threshold.

DETAILED DESCRIPTION

Embodiments of the present disclosure relate to power generation systems and methods of controlling an overspeed event in a gas turbine engine. More specifically, embodiments of the present disclosure include a fuel supply system having a relief valve system for releasing fuel from a fuel manifold before it can reach a combustor in the gas turbine engine. More specifically, the relief valve is used in combination with, and coupled downstream from a shutoff valve that selectively supplies fuel to the fuel manifold. When the shutoff valve is in a closed position, the relief valve is actuated to release fuel trapped downstream from the shutoff valve. As such, the fuel is released before it can further contribute to speed overshoot in the gas turbine engine during a load shedding event.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Figure 1:
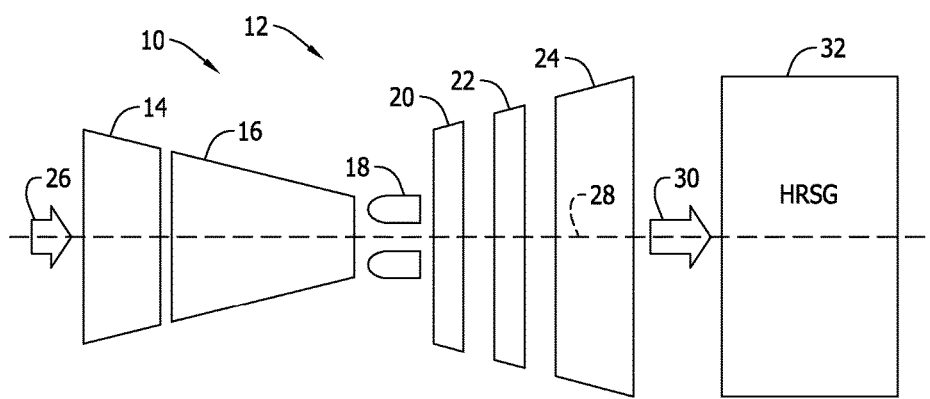
FIG. 1 is a schematic illustration of an exemplary power generation system.

FIG. 1 is a schematic illustration of an exemplary power generation system 10. In the exemplary embodiment, power generation system 10 includes a gas turbine engine 12 that includes a low pressure compressor 14, a high pressure compressor 16, and a combustor assembly 18 positioned downstream from high pressure compressor 16. Gas turbine engine 12 also includes a high pressure turbine 20 positioned downstream from combustor assembly 18, a low pressure turbine 22 positioned downstream from high pressure turbine 20, and a power turbine 24 positioned downstream from low pressure turbine 22.

In operation, a flow of intake air 26 is channeled through low pressure compressor 14 and a flow of compressed air is channeled from low pressure compressor 14 to high pressure compressor 16. The compressed air is discharged from high pressure compressor 16 and channeled towards combustor assembly 18, where the air is mixed with fuel and combusted to form a flow of combusted gas discharged towards high pressure turbine 20. The flow of combusted gas discharged from combustor assembly 18 drives high pressure turbine 20 about a centerline 28 of gas turbine engine 12, and the flow of combusted gas is channeled through turbines 20 and 22 and then discharged from gas turbine engine 12 in the form of a flow of exhaust gas 30. A heat recovery steam generator (HRSG) 32 is coupled in flow communication with gas turbine engine 12. Specifically, HRSG 116 receives exhaust gas 30 discharged from gas turbine engine 12 for producing steam for further use by power generation system 10.

Figure 2:
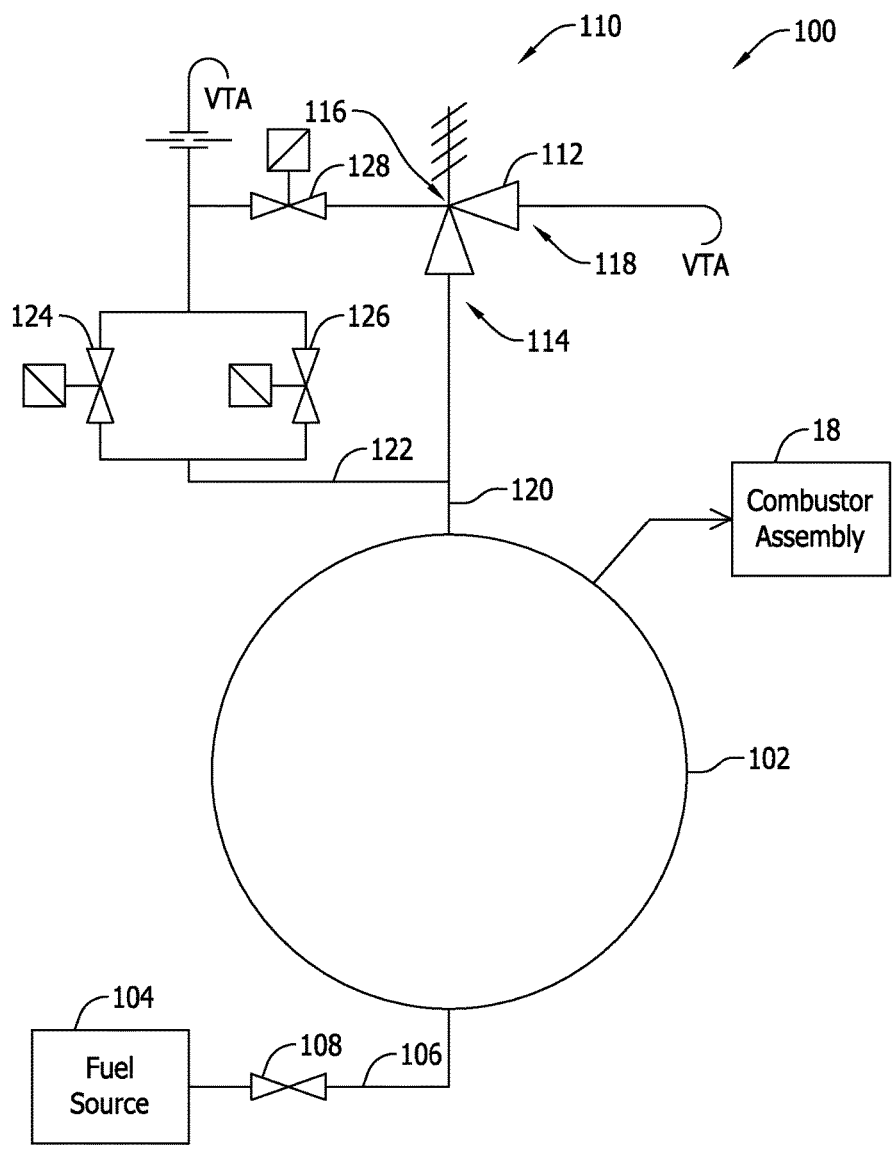
FIG. 2 is a schematic illustration of an exemplary fuel supply system that may be used with the gas turbine engine shown in FIG. 1.

FIG. 2 is a schematic illustration of an exemplary fuel supply system 100 that may be used with gas turbine engine 12 (shown in FIG. 1). In the exemplary embodiment, fuel supply system 100 includes a fuel manifold 102 that receives fuel from a fuel source 104 via a supply line 106, and that supplies the fuel to combustor assembly 18. A shutoff valve 108 is coupled in flow communication with fuel manifold 102 and positioned upstream from fuel manifold 102. More specifically, shutoff valve 108 is coupled along supply line 106. In operation, shutoff valve 108 is selectively actuatable based on an operating condition of gas turbine engine 12. For example, shutoff valve 108 actuates into an open position to allow fuel to be supplied from fuel source 104 to fuel manifold 102 through supply line 106 when gas turbine engine 12 is operating normally. Alternatively, shutoff valve 108 actuates into a closed position to stop the flow of fuel to fuel manifold 102 when gas turbine engine 12 is operating at an overspeed condition. However, fuel remains trapped within fuel supply system 100 downstream from shutoff valve 108, which can cause gas turbine engine 12 to continue to operate at the overspeed condition even when shutoff valve 108 is in the closed position.

In the exemplary embodiment, a relief valve system 110 is coupled in flow communication with fuel manifold 102. More specifically, relief valve system 110 includes a relief valve 112 coupled in flow communication with fuel manifold 102. Relief valve 112 releases fuel from within fuel manifold 102 when shutoff valve 108 is in the closed position, and when a pressure within fuel manifold 102 is greater than a predetermined threshold. Relief valve 112 includes a first inlet 114, a second inlet 116, and an outlet 118. First inlet 114 is in flow communication with a primary discharge line 120 extending between fuel manifold 102 and relief valve 112. Moreover, second inlet 116 is coupled in flow communication with sensing line 122, which is coupled in parallel between primary discharge line 120 and relief valve 112. Primary discharge line 120 channels a first portion of the fuel from fuel manifold 102 towards relief valve 112, and sensing line 122 channels a second portion of the fuel from fuel manifold 102 towards relief valve 112. As such, primary discharge line 120 facilitates channeling a majority of the fuel from fuel manifold 102 therethrough, and the fuel channeled through sensing line 122 facilitates actuating relief valve 112, as will be described in more detail below.

More specifically, relief valve 112 actuates into an open position to allow a flow of fuel in primary discharge line 120 to be channeled through relief valve 112 when a pressure at second inlet 116 is greater than a predetermined threshold. For example, the pressure at second inlet 116 generally corresponds with the pressure within fuel manifold 102. As such, the relatively small, second portion of fuel channeled through sensing line 122 enables relief valve 112 to be actuated in a more accurate and efficient manner.

In one embodiment, at least one sensing valve is coupled along sensing line 122. More specifically, a first sensing valve 124 and a second sensing valve 126 are coupled in parallel along sensing line 122 to provide a redundant sensing system along sensing line 122. In operation, first and second sensing valves 124 and 126 are actuated into an open position when it is determined gas turbine engine 12 is operating at an overspeed condition. As such, the second portion of fuel from fuel manifold 102 is channeled towards relief valve 112, and relief valve 112 is opened when the pressure at second inlet 116 is greater than the predetermined threshold. Relief valve 112 and first and second sensing valves 124 and 126 are closed when the pressure at second inlet 116 falls below the predetermined threshold, which indicates the fuel within fuel manifold 102 has been successfully released and the overspeed condition has been mitigated. In one embodiment, the fuel within fuel manifold 102 is released to the atmosphere. Alternatively, the fuel within fuel manifold 102 is channeled towards an inlet of gas turbine engine 12 to facilitate reducing methane emissions.

In the exemplary embodiment, a testing valve 128 is coupled along sensing line 122 between the at least one sensing valve and relief valve 112. During normal operation, testing valve 128 is in an open position to allow the second portion of fuel to be channeled towards relief valve 112. However, during testing operation (e.g., during startup of gas turbine engine 12), testing valve 128 is in a closed position such that the operating capability of components positioned between fuel manifold 102 and testing valve 128 can be verified.

Figure 3:
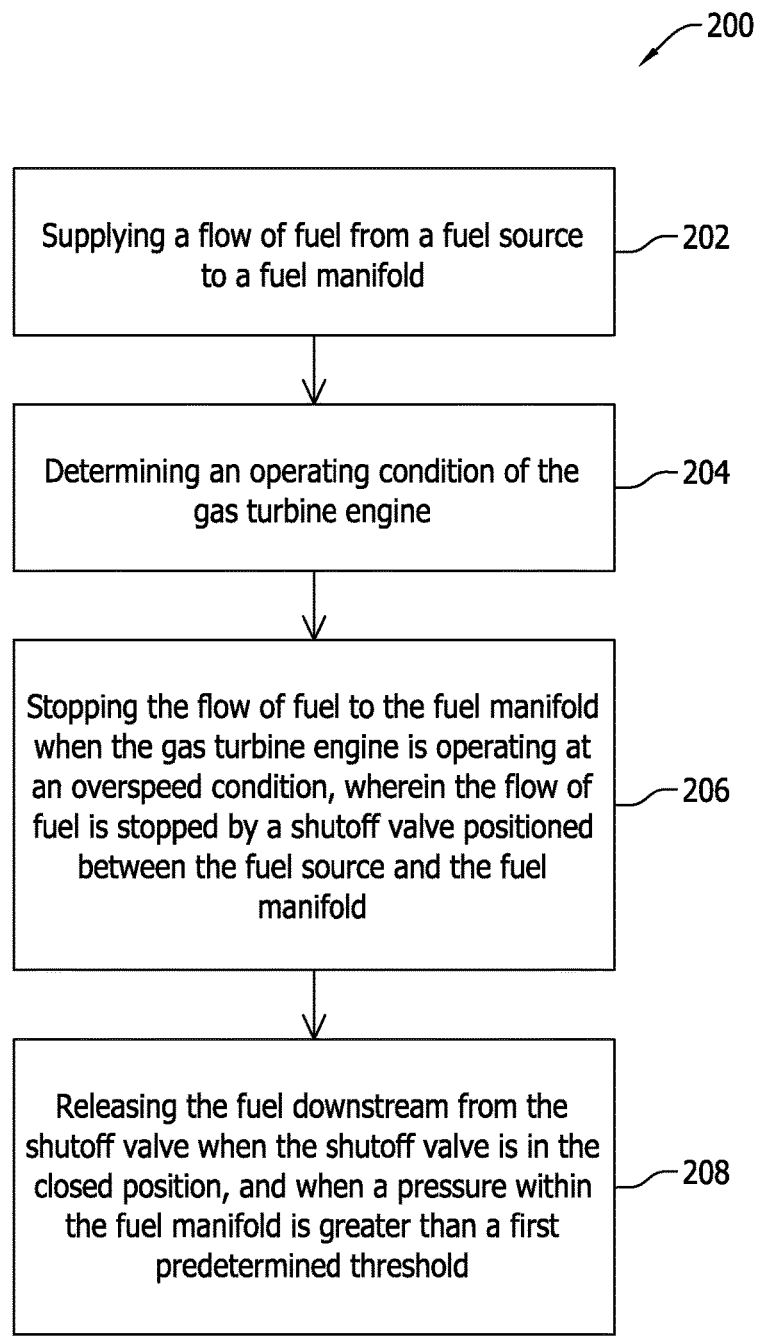
FIG. 3 is a flow diagram illustrating an exemplary method of controlling an overspeed event in a gas turbine engine.

FIG. 3 is a flow diagram illustrating an exemplary method 200 of controlling an overspeed event in a gas turbine engine. In the exemplary embodiment, method 200 includes supplying 202 a flow of fuel from a fuel source to a fuel manifold, determining 204 an operating condition of the gas turbine engine, and stopping 206 the flow of fuel to the fuel manifold when the gas turbine engine is operating at an overspeed condition. The flow of fuel is stopped by a shutoff valve positioned between the fuel source and the fuel manifold. The method 200 also includes releasing 208 the fuel downstream from the shutoff valve when the shutoff valve is in the closed position, and when a pressure within the fuel manifold is greater than a first predetermined threshold.

In one embodiment, method 200 includes channeling a first portion of the fuel from the fuel manifold towards a relief valve along a primary discharge line, and channeling a second portion of the fuel from the fuel manifold towards the relief valve along a sensing line. Method 200 also includes receiving the first portion of the fuel at a first inlet of the relief valve, and receiving the second portion of the fuel at a second inlet of the relief valve. The relief valve is configured to actuate into an open position to allow the fuel in the primary discharge line to be channeled through the relief valve when a pressure at the second inlet is greater than a second predetermined threshold, the pressure at the second inlet corresponding with the pressure within the fuel manifold. Moreover, channeling a second portion includes channeling the second portion of the fuel towards at least one sensing valve coupled along the sensing line, wherein the at least one sensing valve is configured to actuate into an open position when the shutoff valve is in the closed position such that a flow of fuel in the sensing line is channeled towards the relief valve.

An exemplary technical effect of the system and methods described herein includes at least one of: (a) releasing fuel trapped in a fuel manifold downstream from a shutoff valve; (b) reducing the likelihood of damage to a turbine engine during a load shedding event; and (c) improving the shutdown response time of the gas turbine engine during a load shedding event.

Exemplary embodiments of a power generation system and related components are described above in detail. The system is not limited to the specific embodiments described herein, but rather, components of systems and/or steps of the methods may be utilized independently and separately from other components and/or steps described herein. For example, the configuration of components described herein may also be used in combination with other processes, and is not limited to practice with only power generation systems and related methods as described herein. Rather, the exemplary embodiment can be implemented and utilized in connection with many applications where restricting fuel flow in response to an event is desirable.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A fuel supply system for controlling an overspeed condition of a gas turbine engine, said fuel supply system comprising:
   a fuel manifold;
   a shutoff valve coupled in flow communication with said fuel manifold and positioned upstream from said fuel manifold, wherein said shutoff valve is configured to actuate from an open shutoff valve position into a closed shutoff valve position in response to the gas turbine engine operating at the overspeed condition, wherein the closed shutoff valve position precludes fuel from being supplied to said fuel manifold;
   a relief valve;
   a primary discharge line coupled in flow communication between said fuel manifold and said relief valve;
   a sensing line coupled between said fuel manifold and said relief valve in parallel to said primary discharge line, said sensing line configured to supply a first portion of the fuel from said fuel manifold to said relief valve in response to the overspeed condition; and
   at least one sensing valve for determining pressure coupled along said sensing line, wherein said at least one sensing valve is configured to actuate into an open sensing valve position in response to the overspeed condition such that the first portion of the fuel is channeled through said sensing line towards said relief valve, wherein said relief valve is configured to actuate from a closed relief valve position into an open relief valve position in response to being subjected to a pressure in said sensing line greater than a first predetermined threshold, and wherein said relief valve is configured to release a second portion of the fuel from within said fuel manifold via said primary discharge line when said relief valve is in the open relief valve position.

2. The fuel supply system in accordance with claim 1, wherein said relief valve comprises a first inlet coupled in flow communication with said primary discharge line, and a second inlet coupled in flow communication with said sensing line.

3. The fuel supply system in accordance with claim 2, wherein said relief valve is configured to actuate into the open relief valve position in response to being subjected to the pressure greater than the first predetermined threshold at said second inlet.

4. The fuel supply system in accordance with claim 1, further comprising a testing valve coupled along said sensing line between said at least one sensing valve and said relief valve.

5. The fuel supply system in accordance with claim 1, wherein said relief valve is configured to release the first portion of the fuel and the second portion of the fuel from within said fuel manifold to atmosphere.

6. The fuel supply system in accordance with claim 1, wherein said primary discharge line has a larger flow capacity than said sensing line.

7. A gas turbine engine comprising:
   a combustor;
   a fuel manifold configured to supply fuel to said combustor;
   a shutoff valve coupled in flow communication with said fuel manifold and positioned upstream from said fuel manifold, wherein said shutoff valve is configured to actuate from an open shutoff valve position into a closed shutoff valve position in response to the gas turbine engine operating at an overspeed condition, wherein the closed shutoff valve position precludes the fuel from being supplied to said fuel manifold;
   a relief valve;
   a primary discharge line coupled in flow communication between said fuel manifold and said relief valve;
   a sensing line coupled between said fuel manifold and said relief valve in parallel to said primary discharge line, said sensing line configured to supply a first portion of the fuel from said fuel manifold to said relief valve in response to the shutoff valve being in the closed shutoff valve position; and
   at least one sensing valve for determining pressure coupled along said sensing line, wherein said at least one sensing valve is configured to actuate into an open sensing valve position in response to the shutoff valve being in the closed shutoff valve position such that the first portion of the fuel is channeled through said sensing line towards said relief valve, wherein said relief valve is configured to actuate from a closed relief valve position into an open relief valve position in response to being subjected to a pressure in said sensing line greater than a first predetermined threshold, and wherein said relief valve is configured to release a second portion of the fuel from within said fuel manifold via said primary discharge line when said relief valve is in the open relief valve position.

8. The gas turbine engine in accordance with claim 7, wherein said relief valve comprises a first inlet coupled in flow communication with said primary discharge line, and a second inlet coupled in flow communication with said sensing line.

9. The gas turbine engine in accordance with claim 8, wherein said relief valve is configured to actuate into the open relief valve position in response to being subjected to the pressure greater than the first predetermined threshold at said second inlet.

10. The gas turbine engine in accordance with claim 7, wherein said at least one sensing valve comprises a first sensing valve and a second sensing valve coupled in parallel along said sensing line.

11. The gas turbine engine in accordance with claim 7 further comprising a testing valve coupled along said sensing line between said at least one sensing valve and said relief valve, wherein said testing valve is configured such that during normal non-testing operation said testing valve is in an open testing valve position and during testing operation said testing valve is in a closed testing valve position such that an operating capability of components positioned between said fuel manifold and said testing valve can be verified.

12. The gas turbine engine in accordance with claim 7, wherein said relief valve is configured to release the first portion of the fuel and the second portion of the fuel from within said fuel manifold to atmosphere.

13. The gas turbine engine in accordance with claim 7, wherein said primary discharge line has a larger flow capacity than said sensing line.

14. A method of controlling an overspeed condition in a gas turbine engine, said method comprising:
supplying a flow of fuel from a fuel supply to a fuel manifold;
determining an operating condition of the gas turbine engine;
stopping the flow of fuel to the fuel manifold in response to determining that the operating condition is the overspeed condition, wherein the flow of fuel is stopped by actuating a shutoff valve positioned between the fuel supply and the fuel manifold from an open shutoff valve position into a closed shutoff valve position; and supplying a first portion of the fuel from the fuel manifold to a relief valve via a sensing line in response to the overspeed condition, wherein at least one sensing valve for determining pressure coupled along the sensing line actuates into an open sensing valve position in response to the overspeed condition such that the first portion of the fuel is channeled through the sensing line towards the relief valve, and wherein the relief valve actuates from a closed relief valve position into an open relief valve position in response to being subjected to a pressure in the sensing line greater than a first predetermined threshold, such that a second portion of the fuel is released from within the fuel manifold through the relief valve via a primary discharge line coupled in parallel to the sensing line.

15. The method in accordance with claim 14 further comprising:
receiving the second portion of the fuel via the primary discharge line at a first inlet of the relief valve; and
receiving the first portion of the fuel via the sensing line at a second inlet of the relief valve, wherein the relief valve actuates into the open relief valve position in response to being subjected to the pressure greater than the first predetermined threshold at the second inlet.

16. The method in accordance with claim 14, further comprising releasing the first portion of the fuel and the second portion of the fuel from the relief valve to atmosphere.

17. The method in accordance with claim 14, further comprising, subsequent to the relief valve actuating from the closed relief valve position into the open relief valve position, and in response to the relief valve being subjected to the pressure in the sensing line less than the first predetermined threshold, actuating the relief valve to the closed relief valve position and stopping the supply of the first portion of the fuel from the fuel manifold to the relief valve via the sensing line and stopping the second portion of the fuel from the fuel manifold to the relief valve via the primary discharge line.

* * * * *